US005425885A

United States Patent [19]

Zhao

[11] Patent Number: 5,425,885

[45] Date of Patent: Jun. 20, 1995

[54] FIRE RETARDING AND EXTINGUISHING COMPOSITE

[75] Inventor: Guansheng Zhao, Shandong, China

[73] Assignees: Fenglan Zhao, Shandong Province; Huanwen Du, Beijing, both of China

[21] Appl. No.: 987,172

[22] Filed: Dec. 8, 1992

[51] Int. Cl.[6] ........................ A62D 1/00; C09K 21/00

[52] U.S. Cl. .......................................... 252/2; 252/4; 252/601; 252/607; 252/608; 252/610

[58] Field of Search ...................... 252/2, 8, 8.05, 607, 252/610, 611, 608

[56] References Cited

U.S. PATENT DOCUMENTS 3,621,917 11/1971 Rosen et al. ........................ 252/8.05
4,460,480 7/1984 Kleiner et al. ...................... 252/8.05
5,225,095 7/1993 DiMaio et al. ...................... 252/307

*Primary Examiner*—Gary Geist
*Assistant Examiner*—Joseph D. Anthony
*Attorney, Agent, or Firm*—Jacobson, Price, Holman & Stern

[57] ABSTRACT

The present invention concerns a fire retarding and extinguishing composition, specifically, a liquid fire retarding and extinguishing composition for extinguishing fires caused by classes B and A materials and flammable organic solvents. The fire retarding and extinguishing composition of the present invention comprises:

(a) an aqueous extract of plant ash and at least one plant selected from a group consisting of plants of Sapindaceae, Compositae, Cruciferae, Leguminosae, root skin of Ulmaceae, Phytolaccaceae and cotton seed;

(b) at least one surfactant, in an amount of 30–60 percent by weight of the weight of said aqueous extract of plant ash.

22 Claims, 5 Drawing Sheets

FIRE RETARDING AND EXTINGUISHING COMPOSITE

FIELD OF THE INVENTION

The present invention concerns a fire retarding and extinguishing composition, specifically a liquid fire retarding and extinguishing composition for fire extinguishing caused by class B and class A materials and flammable organic solvents. The effective component of the fire retarding and extinguishing composition of the present invention is an aqueous extract of plant ash and a variety of plants.

BACKGROUND OF THE INVENTION

The currently used fire extinguishing agents are fire foam, dry powder extinguishing agent, carbon dioxide extinguishing agent, carbon tetrachloride extinguishing agent, etc. They are usually packed in special extinguishers for use. Depending on the properties of the material on fire, different extinguishing agents are selected. The extinguishing mechanism of the above mentioned extinguishing agents are based on a physical principle to isolate the fire source from air by a protection layer formed by foam, powder, or inert gases, provided by extinguishing agents. It is effective to extinguish stable fire in a small area caused by classes B and A materials when wind speed is not very high. However, for unstable fire under a condition of high wind speed, for example, the wind power is over grade 6, i.e., the wind speed is in the range of about 10.8–13.8 m/s, it is difficult or impossible to achieve the anticipated result. If fires are caused by flammable liquids, such as fuel oils, edible oils, organic solvents, or oil and grease containing materials, because of the unstable combustion, the large quantity energy produced, the high spreading and diffusing abilities, and the high temperature of liquid surface ($>300°$ C.), the currently used fire retarding and extinguishing agents can not be used to extinguish the fires with enough speed and effectiveness. Especially, when the fire occurs on a fuel tank of a vehicle by mechanical collision or traffic accident, the fire expands so swiftly and violently that a strong explosion will happen before the utilization of fire extinguishing equipment, resulting in fire hazard, casualties, and serious economic loss. Besides, the explosion of fuel tanks also can be caused by the static sparks formed in the movement of vehicles, for which the ordinary extinguishing materials are virtually worthless.

For extinguishing fires caused by flammable liquids, such as crude oils, fuel oils, edible oils, organic solvents, etc., and oil and grease containing materials, a variety of chemical fire retarding and extinguishing materials have been developed and produced, such as halogen substituted hydrocarbons, phosphonates, inorganic compounds, etc. However, these chemical fire retarding and extinguishing materials are usually used as additives in polymer engineering materials. Only a few of these materials can be used as fire extinguishing materials, such as fluoro-bromo-alkanes, which, however, are hardly to be used extensively because of the expensive cost and the destruction effect to the ozonosphere. Moreover, since these materials are water insoluble, it is very difficult to prepare a fire retarding and extinguishing agent using an aqueous solvent.

OBJECTIVES OF THE INVENTION

An object of the present invention is to provide a fire retarding and extinguishing composition using an aqueous extract of plant ash and a variety of plants as effective components, the raw materials thereof are extensively available, the processing procedure therefor is very simple, and the cost therefor is lower.

A further object of the present invention is to provide a liquid fire retarding and extinguishing composition using water as solvent for extinguishing fires (caused by class B and class A materials) rapidly and effectively.

Still a further object of the present invention is to provide a liquid fire retarding and extinguishing composition using water as solvent for extinguishing fires of fuel tanks of various vehicles and airplanes rapidly and avoiding the danger of explosion of fuel tanks.

Still a further object of the present invention is to provide a liquid fire retarding and extinguishing composition using water as solvent for extinguishing fires of flammable organic solvents, crude oils, heavy oils, oil residues, and oil and grease containing materials rapidly and effectively.

Still a further object of the present invention is to provide a liquid fire retarding and extinguishing composition using water as solvent with good anti-re-ignition performance.

The other objects, advantages and effectiveness of the present invention will be clearly illustrated hereinafter.

SUMMARY OF THE INVENTION

Figure 1:
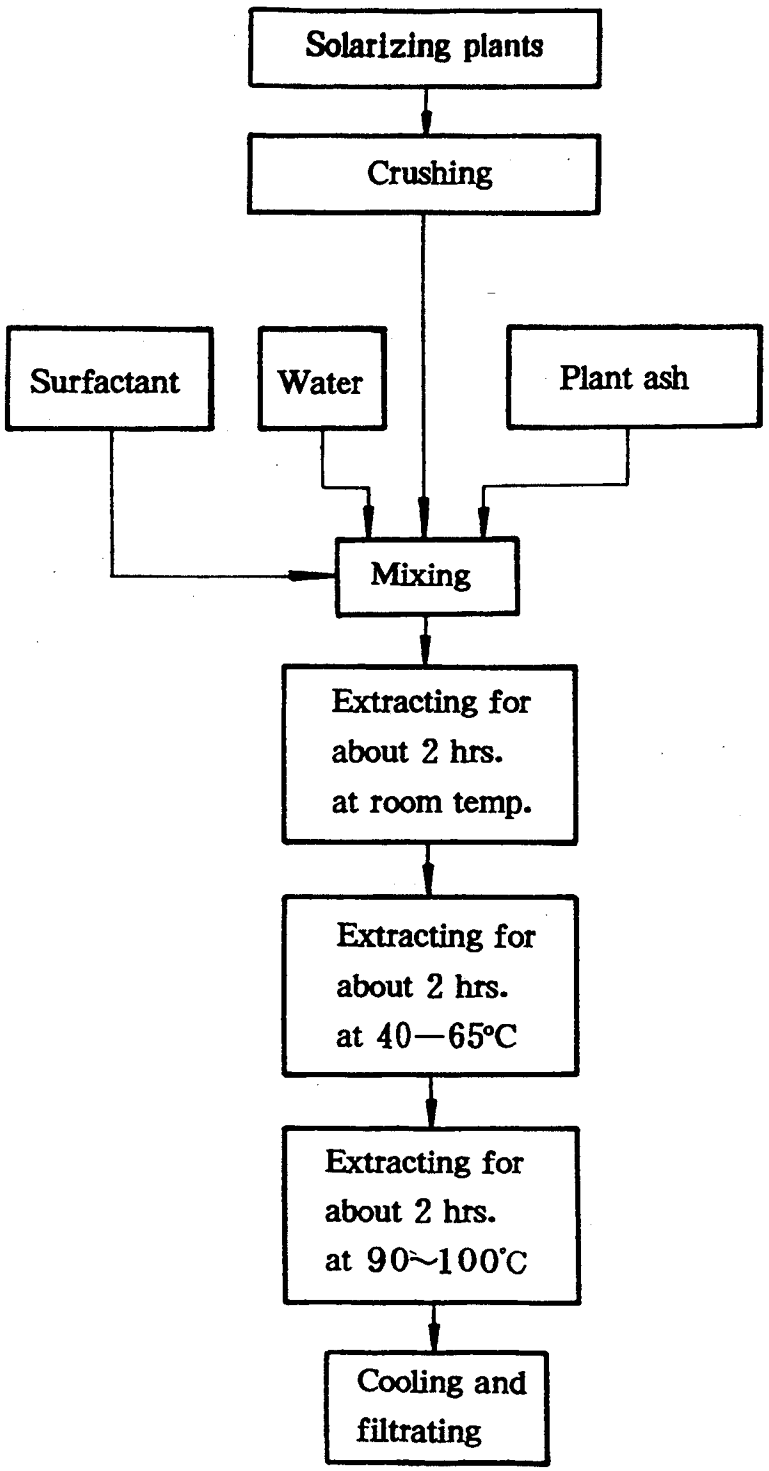
FIG. 1 is a flow scheme for preparing the aqueous extract of plant ash and plants of the fire retarding and extinguishing composition of the present invention.

The present invention concerns a fire retarding and extinguishing composition, specifically, a liquid fire retarding and extinguishing composition for extinguishing fires caused by classes B and A materials and flammable organic solvents. The fire retarding and extinguishing composition of the present invention comprises:

(a) an aqueous extract of plant ash and at least one plant selected from a group consisting of plants of Sapindaceae, Compositae, Cruciferae, Leguminosae, root skin of Ulmaceae, Phytolaccaceae and cotton seed;

(b) at least one surfactant, in an amount of 30–60 percent by weight of the weight of said aqueous extract of plant ash and plant(s).

In a preferred example according to the present invention, said fire retarding and extinguishing composition comprises:

(a) an aqueous extract of plant ash and at least one plant selected from a group composition of plants of *Artemisia annua* L., *Artemisia palustris* Linn., root skin of *Ulmus pumila* L., *Artemisia argyi* Levl. et Vant, *Gleditsia sinensis* Lam., *Brassica campestris* L. var. oleifera DC, *Brassica oleracea* L. var. Capitata L., *Sapindus mukorossi* Gaertn, cotton seed, Centaurea Cyanus Linn., *Acacia pennata* Willd, *Artemisia halodendron* Turcz., root skin of *Ulmus glabra* Huds., Phaseolus Multiflorus Willd and *Phytolacca acinosa* Roxb.;

(b) at least one surfactant, in an amount of 30–60 percent by weight of the weight of said aqueous extract of plants and plant ash;

(c) an aqueous extract of plant ash, in an amount 1–20 times of the total weight of (a)+(b).

DETAILED DESCRIPTION OF THE INVENTION

The present invention concerns a fire retarding and extinguishing composite, specifically, a liquid fire retarding and extinguishing composition for extinguishing fire caused by class B and class A materials and flammable organic solvents. Said fire retarding and extinguishing composition comprises:

(a) an aqueous extract of plant ash and at least one plant selected from a group consisting of plants of Sapindaceae, Compositae, Cruciferae, Leguminosae, root skin of Ulmaceae, Phytolaccaceae and cotton seed;

(b) at least one surfactant, in an amount of 30–60 percent by weight of the weight of said aqueous extract of plant ash and plants.

In the fire retarding and extinguishing composition of the present invention, said Sapindaceae plants include *Sapindus mukorossi* Gaertn, Sapindus discolor muell. Arg.; said Compositae plants include Centaurea Cyanus Linn, and *Centaurea moschata* of Centaurea L.; *Artemisia annua* L., *Artemisia palustris* Linn., *Artemisia halodendron* Turcz. *Artemisia apiacea* Hance, *Artemisia argyi* Levl. et Vant, and *Artemisia vulgaris* L. of Artemisia L.; said Cruciferae plants include *Brassica chinensis* L., *Brassica oleracea* L. var. Capitata L., *Brassica juncea* Czern. et Coss, *Brassica pekinensis* Rupr., and *Brassica campestris* L. var oleifera DC of Brassica; said Leguminosae plants include Glycine max Merrill, *Glycine soja* sieb. et Zucc of Glycine Willd; Phaseolus Multiflorus Willd of Phaseolus L.; *Gymnocladus chinensis* Bail. of Gymnocladus Lam.; *Gleditsia sinensis* Lam., *Gleditsia melanacantha* and *Gleditsia microphylla* of Gleditschia; and *Acacia pennata* Willd of Acacia Mill; said Ulmaceae plants include *Ulmus pumila* L., *Ulmus glabra* Huds., *Ulmus keaki, Zelkova schneideriana* H.-M. of Ulmus L.; said Phytolacca plants include *Phytolsvvs acinosa* Roxb. of Phytolacca L.

Said plants are preferably the following plants: *Artemisia annua* L., *Artemisia palustris* Linn., root skin of *Ulmus pumila* L., *Artemisia argyi* Levl. et Vant, *Gleditsia sinensis* Lam., *Brassica campestris* L. var. oleifera DC, *Brassica oleracea* L. var. Capitata L., *Sapindus mukorossi* Gaertn, cotton seed, Centaurea Cyanus Linn., *Acacia pennata* Willd, *Artemisia halodendron* Turcz., root skin of *Ulmus glabra* Huds., Phaseolus Multiflorus Willd and *Phytolacca acinosa* Roxb.

In the fire retarding and extinguishing composition of the present invention, said surfactant can be anionic surfactant, non-ionic surfactant, or amphoteric ion surfactant, such as dodecyl polyethenoxy sodium sulfate, dodecanol polyethenoxy ether, sodium dodecyl aminopropionate, and nonyl phenol polyethenoxy ether, or a mixture of two or more than two surfactants, for example, a mixture of sodium dodecyl aminopropionate and nonyl phenol polyethenoxy ether with a weight ratio of (40–60):(60–40).

The flow scheme for preparing the aqueous extract of the fire retarding and extinguishing composite of the present invention is shown in FIG. 1:

Solarizing the selected plants, crushing into pieces of 5–30 mm by a crusher, mixing with plant ash and water according to a weight proportion of (5–10):(3–5):(-30–50), putting into a sealed container, extracting for about 2 hours under room temperature, heating the mixture to a temperature of about 40° to about 65° C. and extracting for about 2 hours, and finally heating the mixture to a temperature of about 90° to about 100° C. and retaining the temperature for another 2 hours, cooling the obtained mixture to a temperature of about 40° C. or lower, and then filtering twice with filtering cloth to remove solid materials to obtain the aqueous extract of plants and plant ash. In order to make the extraction of plants and plant ash more effective, one or more surfactants, such as sodium dodecylbenzene sulfonate, Tween-80, etc., can be added. The amount of the surfactant is usually 5–10 percent by weight of the weight of the water used.

According to a preferred example of the fire retarding and extinguishing composition of the present invention, said aqueous extract is an aqueous extract of 4 parts of plant ash, 1 part of *Artemisia annua* L., 1 part of *Artemisia palustris* Linn., 0.5 part of root skin of *Ulmus pumila* L., 1 part of *Artemisia argyi* Levl. et Vant, 2 parts of *Gleditsia sinensis* Lam., and 2 parts of *Brassica campestris* L. var. oleifera DC, with 40 parts of water (all based on weight).

In another preferred example of the fire retarding and extinguishing composition of the present invention, said aqueous extract is an aqueous extract of 4 parts of plant ash, 1 part of *Artemisia annua* L., 0.5 part of root skin of *Ulmus pumila* L., 1 part of *Artemisia argyi* Levl. et Vant, 2 parts of *Brassica oleracea* L. var. Capitata L., 2 parts of Sapindus, 2 parts of cottonseed, and 1 part of Centaurea Cyanus Linn., with 40 parts of water (all based on weight).

In another preferred example of the fire retarding and extinguishing composition of the present invention, said aqueous extract is an aqueous extract of 4 parts of plant ash, 2 parts of Phaseolus Multiflorus Willd, 1 part of *Brassica oleracea* L. var. Capitata L., 1 part of *Acacia pennata* Willd, 1 part of *Gleditsia sinensis* Lam., 1 part of *Sapindus mukorossi* Gaertn, and 1 part of *Artemisia halodendron* Turcz., with 40 parts of water (all based on weight).

According to an embodiment of the present invention, the fire retarding and extinguishing composition also contains at least one stabilizer, such as triethanolamine, carboxymethylcellulose, or carboxymethylcellulose sodium salt; at least one preservative, such as sodium nitrate, benzotriazole, or hexamethylene tetramine; and at least one anti-freezing agent, such as calcium chloride, glycol, or lithium chloride.

Since fire retarding and extinguishing agent is usually stored in containers or extinguishing equipment for a certain time period, it is necessary to improve the stability of the composition in storage and to prevent equipment from corrosion caused by the liquid composite both in storage and application. Based on these concerns, the composition contains 0.7–1.4 parts of triethanolamine, 1–8 parts of sodium nitrite, 0.5–3 parts of carboxymethylcellulose or carboxymethylcellulose sodium salt, 0.2–0.4 part of hexamethylene tetramine, and 10–30 parts of calcium chloride or glycol, based on 100 parts of said aqueous extract. Calcium chloride is usually selected as anti-freezing agent, however, glycol is preferred for frigid zone where the temperature may be lower than −20° C.

Figure 2:
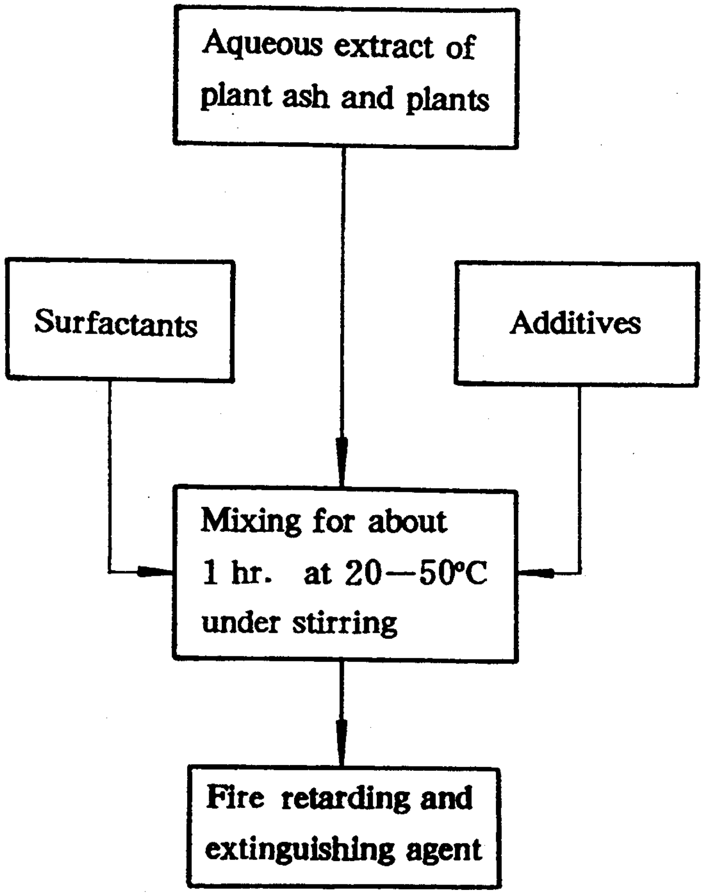
FIG. 2 is a flow scheme for preparing the fire retarding and extinguishing composition of the present invention.

The flow scheme for preparing the fire retarding and extinguishing composition is shown in FIG. 2. As shown in FIG. 2, the aqueous extract of said plants and plant ash is put into a sealed container equipped with a stirrer, and is heated to 25°–50° C. The surfactants and various additives are added sequentially while stirring, followed by stirring for about 1 to about 2 hours to thoroughly dissolve and mix all the materials homogeneously, filtering twice with filtering cloth to remove solid materials, the fire retarding and extinguishing composition of the present invention is thus obtained.

Said fire retarding and extinguishing composition of the present invention may be diluted by tap water according a desired weight ratio in the range of 1:1–10 before application. When it is applied to extinguish fire, conventional extinguishing methods can be used, such as spraying onto fire by high pressure nozzle, or applying to the liquid surface under the fire. The preferred method is to apply it onto the liquid surface.

Besides, the fire retarding and extinguishing composition of the present invention can also be diluted by an aqueous extract of plant ash prepared from a mixture of plant ash and water with a weight ration of (1–20):20.

The present invention also provides a fire retarding and extinguishing composition comprising:

(a) an aqueous extract of plant ash and at least one plant selected from a group consisting of plants of *Artemisia annua* L., *Artemisia palustris* Linn., root skin of *Ulmus pumila* L., *Artemisia argyi* Levl. et Vant, *Gleditsia sinensis* Lam., *Brassica campestris* L. var. oleifera DC, *Brassica Oleracea* L. var. Capitata L., *Sapindus mukorossi* Gaertn, cotton seed, Centaurea Cyanus Linn., *Acacia pennata* Willd, *Artemisia halodendron* Turcz., root skin of *Ulmus glabra* Huds., Phaseolus Multiflorus Willd and *Phytolacca acinosa* Roxb.;

(b) at least one surfactant in an amount of 30–60 percent by weight of the weight of said aqueous extract of plant ash and plants;

(c) an aqueous extract of plant ash in an amount 1–20 times of the total weight of (a)+(b).

In the above-mentioned fire retarding and extinguishing composition of the present invention, said aqueous extract of plant ash (component c) is prepared by mixing plant ash with tap water while stirring according to a weight ratio of (1–5):20, followed by keeping it still under ambient temperature for about 10 minutes to about 1 hour, filtering twice with filtering cloth to remove solid impurities to obtain the aqueous extract of the plant ash.

Similarly, for making the fire retarding and extinguishing composition with high stability in storage and non-corrosive to equipment, said fire retarding and extinguishing composite also comprises 0.7–1.4 parts of triethanolamine, 1–8 parts of sodium nitrite, 0.2–0.4 parts of hexamethylene tetramine, and 10–20 parts of calcium chloride or glycol, based on each 100 parts of the total weight of said components (a)+(c).

This type of fire retarding and extinguishing composition of the present invention can be directly applied.

The specifications of the fire retarding and extinguishing composition of the present invention are as follows:

Density: ≧1.10 g/cm$^3$ (20° C.).
Appearance: light brown and clear liquid.
pH: ≦8 (20° C.).
Viscosity: 300 m.Pa.s (20° C.).
Freezing point: −10°–−30° C.
Corrosion rate: ≦10 mg/(d.dm$^2$).
Precipitate: invisible.
Toxicity: LD50>2000 mg/kg (Horn's method).
Fire retarding performance: 1–5 seconds.
Fire retarding and extinguishing performance: 3–9 seconds.
Anti-re-ignition performance: non-flashable, non-flammable.

The fire retarding performance, retarding and extinguishing performance, and anti-re-ignition performance of the fire retarding and extinguishing composition of the present invention are measured according to the following methods.

1. Fire retarding performance

Figure 3:
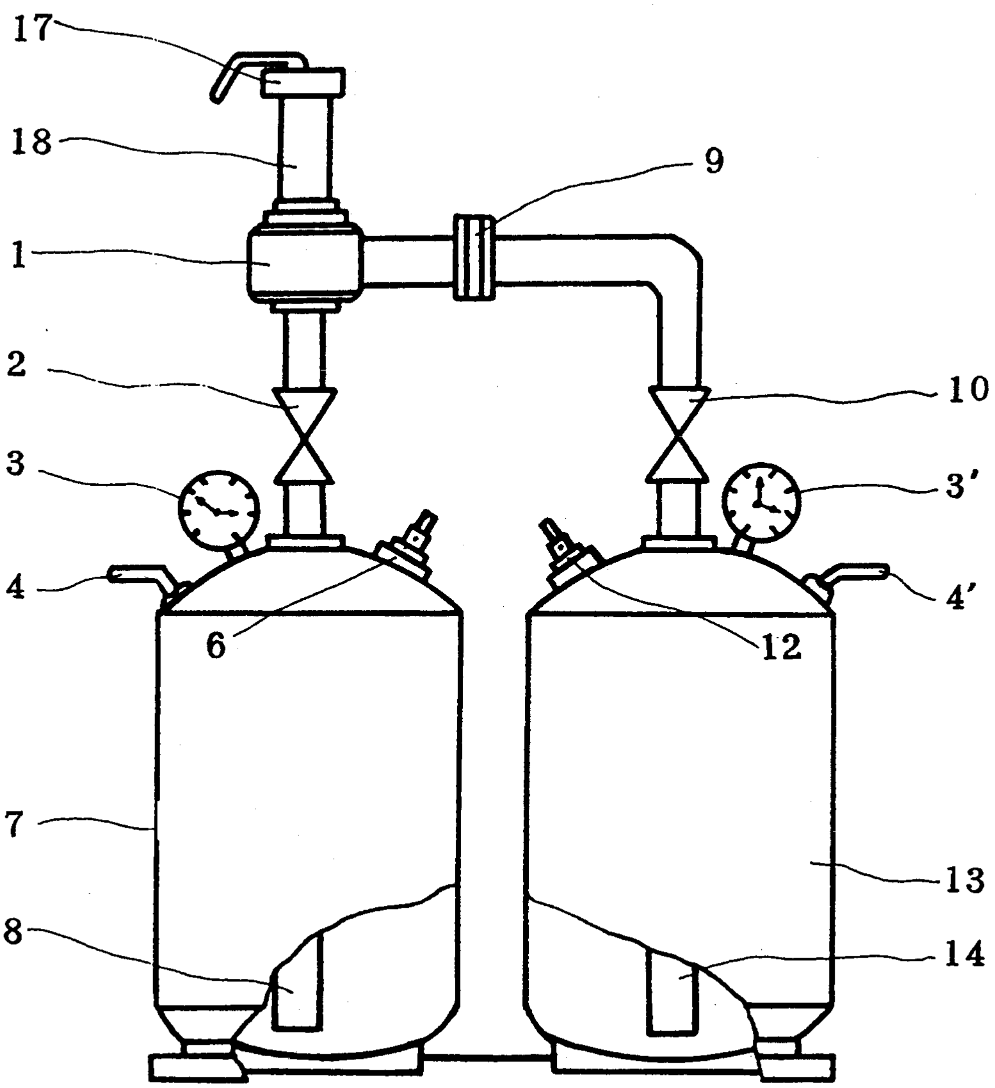
FIG. 3 is a schematic drawing of the equipment for measuring the fire retarding performance and anti-re-ignition performance of the fire retarding and extinguishing composition of the present invention.
Figure 4:
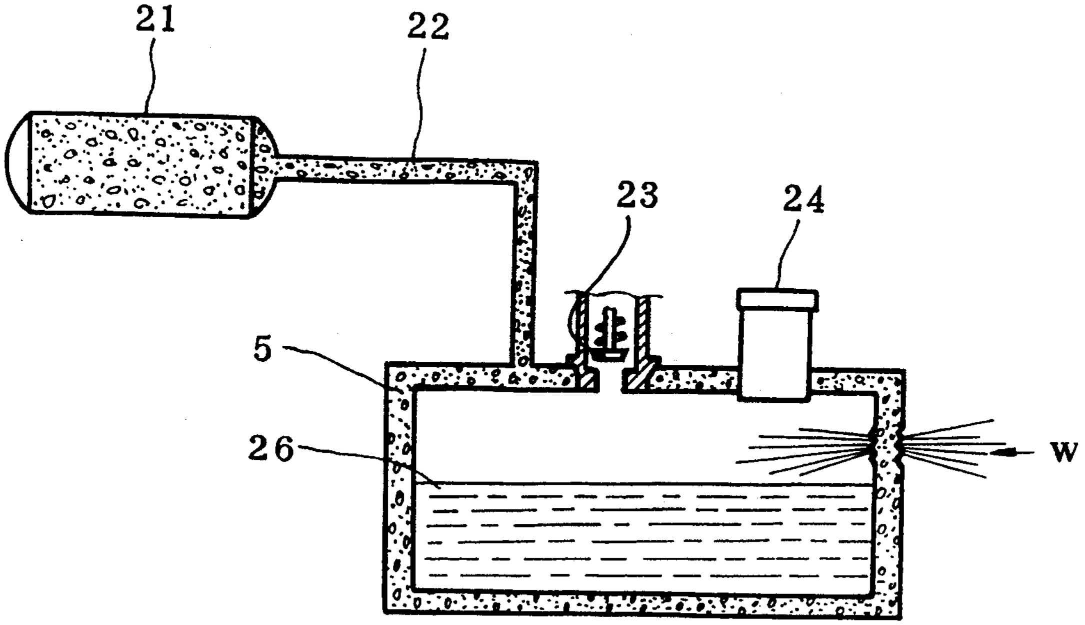
FIG. 4 is a schematic drawing of an analogue device for extinguishing fires occurring in fuel tanks of vehicles.

The fire retarding performance of the fire retarding and extinguishing composition of the present invention is measured with the equipment shown in FIG. 3. Said equipment includes: a 20 liter container (7) for flammable oil, and a 20 liters container (13) for fire retarding and extinguishing composite. An oil tube (8) with a diameter of 9.2 mm is inserted through the top of container (7) and down to the bottom of container (7), an oil spray switch (2) is disposed at the upper part of tube (8) and above the top of container (7). An inlet (4) for pressured air is disposed on one side of the top of container (7). And an inlet (6) for flammable oil is disposed on the other side of the top of container (7). A pressure gauge (3) is disposed on the top of container (7). A tube (14) with a diameter of 25.4 mm is inserted through the top of container (13) and down to the bottom of container (13), a spray switch (10) is disposed on the upper part of tube (14), a flow control valve (9) is disposed above spray switch (10). An inlet for pressured air (4') is disposed on one side of the top of the container (13). An inlet (12) for fire retarding and extinguishing composite is disposed on the other side of the top of container (13). A pressure gauge (3') is also disposed on the top of container (13). The interconnection of tube (14) and oil tube (8) forms a fire retarding and extinguishing chamber (1), above which is a flow-mixing zone (18). A receiver (17) is disposed above flow-mixing zone (18). Said container (7) and container (13) are all pressure containers with a working pressure of higher than 1.5 MPa.

For testing, 10 liters of flammable oil having an initial boiling point higher than 88° C., and an end boiling point lower than 105° C., and 10 liters solution of the fire retarding and extinguishing composite of the present invention is added respectively to container (7) and container (13). The pressure of containers (7) and (13) are controlled respectively at 0.46–0.5 MPa and 0.55–0.60 MPa. The oil spray switch (2) is then opened, and the oil sprayed out is ignited by an igniter. The height of the spurt flame can be higher than 8 meters. When the height of the flame attains the maximum, spray switch (10) is opened. The volumes of the flammable oil and the fire retarding and extinguishing composition are controlled by flow control valve (9) to a ratio of 0.5:1. The time duration between opening spray switch (10) and completely extinguishing the flame is recorded. The test is repeated twice to obtain the average result of two tests as fire retarding performance.

2. Fire retarding and extinguishing performance

Flammable oil, oil tray, and the distribution of oil trays, are the same as the standard method of ISO 7202. The fire retarding and extinguishing composition of the present invention is added to a 3 kg extinguisher for test. The flammable oil is ignited and is kept for burning for 2 minutes, the valve of the fire retarding and extinguishing composition containing pressure container is then opened to spray the fire retarding and extinguishing composite with a flow rate of 0.06 $l/m^2$. sec onto said oil tray being on fire. The time duration between starting spraying and completely extinguishing fire is recorded. The test is repeated twice to obtain the average result of two tests as fire retarding and extinguishing performance.

3. Anti-re-ignition performance 200 ml of the mixture of the flammable oil and the fire retarding and extinguishing composition of receiver (17) obtained from the test for the fire retarding and extinguishing performance is taken into a 250 ml graduate and is kept still for about 15 minutes. Then it is added into an open flash point tester of Model SYB 1001 to the first graduate line. The flame height of an ignitor is adjusted to about 8 to about 9 mm and disposed at a position about 14–15 mm above the liquid surface of said mixture to observe the results.

The fire retarding and extinguishing composite of the present invention uses the aqueous extract of plant ash and at least one plant selected from the group consisting of plants of Sapindaceae, Compositae, Cruciferae, Leguminosae, root skin of Ulmaceae, Phytolaccaceae and Cotton seed as effective component, and at least one surfactant is blended with the aqueous extract. Therefore, synergic fire retarding and extinguishing effects are achieved: it not only has physical fire retarding and extinguishing functions by isolating flammable material, such as oil, from air, but also has chemical fire retarding and extinguishing functions by destroying the transmission of combustion chain.

According to the present invention, the plant ash and the plants selected from the group consisting of plants of Sapindaceae, Compositae, Cruceferae, Leguminosae, root skin of Ulmaceae, Phytolaccaceae and Cotton seed have more materials which have fire retarding and extinguishing functions, such as halogenated derivatives. The aqueous extract thereof also contains said materials having fire retarding and extinguishing functions. When the composition of the present invention is applied to extinguish fire, the halogenated derivatives contained therein will be decomposed under high temperature to produce halogen free radical X·, and the produced halogen free radical will combine with hydrogen free radical rapidly to form HX, while the formed HX is then combined rapidly with HO·, HOO· produced during the combustion of flammable material. Thereby, the transmission of combustion chain or the flame diffusion will be slowed up or terminated. The said aqueous extract also contains a large amount of phosphates and phosphate esters, which can be converted into metaphosphates under high temperature, and the formed metaphosphates are then inverted into stable polymeric forms, and thus protective films are formed around the flammable materials for preventing the contact of flammable material with oxygen. Therefore, the spread of fire can be prevented. In addition, the inorganic salts and silicates presented in said aqueous extract can also form isolating and preventing films around flammable materials. Potassium carbonate contained in the aqueous extract, coming from plant ash, will produce carbon dioxide continuously by heat decomposition under high temperature, the produced carbon dioxide will forms an inert gas screen around flammable materials which can also effect well fire retardation function. Furthermore, the said aqueous extract contains a large amount of various polysaccharides, celluloses, fatty acids, as well as proteins. In combination with surfactants, they can form a complexing emulsifier having excellent emulsifying effects. Said complexing emulsifier is also a good fire foam.

When the composition of the present invention is sprinkled over the surface of the combusting flammable liquid, it spreads on the surface of the combusting flammable liquid, disperses in the flammable liquid and makes the flammable liquid emulsified to form a extremely small oil in water emulsion. During the dispersion of the composite of the present invention and the emulsification of flammable liquid, the flammable liquid is modified at the same time, and protective layers of fire foam layer, micelle layer as well as gel layer are formed around oil beads deterring the contact of oil with oxygen. The aqueous extract of plant ash and plants contains a large amount of salts, esters, saccharides, celluloses and proteins which can form films around flammable liquid under high temperature, and the formed films has good flowability, covering power and excellent fire resistance. Therefore, they can deter the contact of combusting materials with oxygen effectively, prevent fire spread, and extinguish fire rapidly. In addition, the composition of the present invention can make flammable materials modified, thus it has excellent anti-re-ignition performance.

When the composition of the present invention is sprinkled onto the combusting solid materials, such as wood, cotton seed, and oil-containing spun cotton, it can soak and permeate into the inner fibre of said solid flammable material, and forms an uniform fire retarding film on the surface of said flammable materials. Therefore, it can extinguish fire rapidly.

Due to the synergistic fire retarding and extinguishing effects and the excellent properties mentioned above, the composition of the present invention can be widely used to extinguish various fires except fires caused by electricity and metals. It is specially suitable to extinguish fires caused by liquid flammable materials, such as crude oils, various petroleum products, for example gas lines, kerosenes and diesel oils, etc., edible oils, organic solvents, various chemicals, except metals, substances containing greases and oils, for example spun cotton containing oils, woods. In addition, the composite of the present invention can also be used to extinguish fire occurring in structures or fire caused by the combustion of solid substances.

In combination with a special device disposed on fuel tanks of various vehicles, the fire retarding and extinguishing composition of the present invention is the most effective fire extinguishing agent for extinguishing fires occurring in fuel tanks of vehicles.

By adopting the composition of the present invention, fire extinguishing rate is high, and is greater than that by adopting conventional extinguishant. In general, it only takes about 1–5 seconds to complete fire extinguish. Compared with the expensive fluorobromoalkane extinguishants, such as 1211, 1202 and 1301, the fire extinguishing effects of the composition of the present invention are not worse than that of the former, but the cost of the latter is lower than that of the former. Compared with the widely used trifluorobromomethane extinguishant, the resistance to explosive combustion and fire extinguishing effect of the composition of the present invention is slightly better than those of the former. In addition, the composition of the present invention will not pollute the atmosphere where it being used.

The plants selected to prepare the composition of the present invention have rich resources and are very cheap, the process and equipment for the preparation are very simple, thus the cost of the said composition is much lower, just about one fifth to about one tenth of that of the conventional fire extinguishant.

The fire retarding and extinguishing composition of the present invention can also be used to treat papers, paperboards, plastics, and timber, etc., to obtain products thereof having flame resistance.

The present invention will be further described, but not limited by the following Examples.

EXAMPLE 1

Solarized *Artemisia annua* L. 10 kg, *Artemisia palustris* Linn. 10 kg, root skin of *Ulmus pumila* L. 5 kg, *Artemisia argyi* Levl. et Vant 10 kg, *Gleditsia sinensis* Lam. 20 kg, and *Brassica oleracea* campestris L. var oleifera DC 20 kg were crushed in a pulverizer to obtain crushed aggregates having diameter of about 10 mm. And then the crushed aggregates, together with plant ash 40 kg, Tween-80 20 kg, and water 400 kg were added into a sealed mixer installed a jacket and a stirring unit and mixed homogeneously under stirring. Extract was kept for 2 hours at ambient temperature. And then the mixture was heated to 40° C. and kept for extracting for 2 hours. Finally, the mixture was heated to 95° C. and kept for extracting for another 2 hours. After that, the resultant was cooled to 40° C. and filtrated twice with filter cloth to obtain aqueous extract of plant ash and plants.

The obtained aqueous extract was added into a mixer installed with stirring unit, and then nonyl phenol polyethenoxy ether 120 kg, sodium dodecyl aminopropionate 120 kg, benzotriazole 20 kg, sodium nitrite 60 kg, diethanol 80 kg, triethanolamine 4 kg, hexamethylene tetramine 1.5 kg were added subsequently into said mixer, heated to 30° C. and stirred for about 1 hour to obtain a fire retarding and extinguishing composition of the present invention.

The obtained composition was mixed homogeneously with tap water at a ratio of 1:3 (volume). The performance of fire retarding, fire retarding and extinguishing, and resistance to after combustion of the said composition were measured according to the methods mentioned above. The results were as follows:

Fire retarding performance: 4 s

Fire retarding and extinguishing performance: 7 s

Resistance to after combustion: non-flashable, nonflammable.

EXAMPLE 2

Solarized *Artemisia annua* L. 10 kg, root skin of *Ulmus pumila* L. 10 kg, *Artemisia argyi* Levl. et Vant 10 kg, *Brassica oleracea* L. var. Capitata L. 20 kg, *Sapindus mukorossi* Gaertn 20 kg, Cotton seed 20 kg, and Centaurea Cyanus Linn 10 kg were crushed in a pulverizer to obtain crushed aggregates having diameter of about 15 mm. Then the crushed aggregates, together with plant ash 40 kg, Tween-80 25 kg, and water 400 kg were added into a sealed mixer installed a jacket and a stirring unit, and mixed homogeneously under stirring. Extract was kept for 2 hours at ambient temperature. And then the mixture was heated to 45° C. and kept for extracting for 2 hours. Finally, the mixture was heated to 95° C. and kept for extracting for another 2 hours. After that, the resultant was cooled to 40° C. or lower, and filtrated twice with filter cloth to obtain aqueous extract of plant ash and plants.

To obtained aqueous extract was added into a mixer installed with stirring unit, and then sodium dodecyl polyethenoxy sulfate 250 kg, benzotriazole, 12 kg, sodium nitrite 32 kg, calcium chloride 50 kg, tetramine 2.8 kg, hexamethylene tetraamine 0.8 kg were added subsequently into said mixer, heated to 50° C. and stirred for about 1 hour to obtain a fire retarding and extinguishing composition of the present invention.

The obtained composition was mixed homogeneously with tap water at a ratio of 1:3 (volume). The performances of fire retarding, fire retarding and extinguishing, and resistance to after combustion of the said composite were measured according to the methods mentioned above. The results were as follows:

Fire retarding performance: 4 s

Fire retarding and extinguishing performance: 6 s

Resistance to after combustion: non-flashable, nonflammable.

EXAMPLE 3

Solarized *Artemisia palustris* Linn. 20 kg, *Brassica oleracea* L.var. Capitata L. 10 kg, *Acacia pennata* Willd 10 kg, *Gleditsia sinensis* Lam. 10 kg, *Sapindus mukorossi* Gaertn 10 kg, *Artemisia halodendron* Turcz. 10 kg were crushed in a pulverizer to obtain crushed aggregates having diameter of about 15 mm. Then the crushed aggregates, together with plant ash 40 kg, sodium dodecyl benzene sulfonate 40 kg, and water 400 kg were added into a sealed mixer installed a jacket and a stirring unit, and mixed homogeneously under stirring. Extract was kept for 2 hours at ambient temperature. And then the mixture was heated to 65° C. and kept for extracting for 2 hours. Finally, the mixture was heated to 90° C. and kept for extracting for another 2 hours. After that, the resultant was cooled to 40° C. or lower, and filtered twice with filter cloth to obtain aqueous extract of plant ash and plants.

The obtained aqueous extract was added into a mixer installed with stirring unit, and then sodium dodecanol polyethenoxy sulfate 210 kg, benzotriazole 18 kg, sodium nitrite 50 kg, calcium chloride 40 kg, triethanolamine 5.5 kg, hexamethylene tetramine 1.2 kg were added subsequently into said mixer, heated to 40° C. and stirred for about 1 hour to obtain a fire retarding and extinguishing composition of the present invention.

The obtained composition was mixed homogeneously with tap water at a ratio of 1:3 (volume). The performances of fire retarding, fire retarding and extinguishing, and resistance to after combustion of the said composite were measured according to the methods mentioned above. The results were as follows:

Fire retarding performance: 3 s

Fire retarding and extinguishing performance: 5 s

Resistance to after combustion: non-flashable, non-flammable.

EXAMPLES 4-6

The same procedure of Example 1 was adopted to produce compositions of the present invention having various compositions. The components used in these examples are listed in Table 1.

TABLE 1

| Raw materials | Examples (kg) 4 | 5 | 6 |
|---|---|---|---|
| *Artemisia annua* L. | 20 | | 10 |
| *Artemisia palustris* Linn. | | 20 | 10 |
| root skin of *Ulmus glabra* Huds. | 15 | 10 | |
| *Artemisia argyi* Levl. et vant | | 15 | 10 |
| *Brassica oleracea* L. var. Capitata L. | 20 | | 15 |
| *Acacia pennata* Willd | | 10 | |
| *Glycine soja* sieb. et Zucc | 15 | | 5 |
| *Phytolacca acinosa* Roxb | 10 | | |
| *Gleditsia sinensis* Lam. | | 10 | 15 |
| Tween-80 | | 20 | 5 |
| Sodium dodecyl benzene sulfonate | 20 | | 15 |
| Water | 400 | 400 | 400 |
| Plant ash | 40 | 40 | 40 |
| Sodium dodecanol polyethenoxy sulfate | 150 | | 50 |
| Sodium dodecyl polyethenoxy sulfate | | 250 | |
| Nonyl phenyl polyethenoxy ether | 100 | | 150 |
| Sodium dodecyl amino propionate | | | 50 |
| Benzotriazole | | 10 | 10 |
| Sodium nitrile | 50 | 56 | 60 |
| Diethanol | 40 | | 35 |
| Calcium chloride | | 40 | |
| Triethanolamine | 5 | 6 | 5 |
| Hexamethylene tetramine | | 4 | |
| Carboxymethyl cellulose | 4 | | 4 |

The obtained composition were diluted with tap water at a volume ratio of 1:3 to measure their performances of fire retarding, fire retarding and extinguishing, and anti-re-ignition. The results were listed in Table 4.

EXAMPLES 7-9

The same procedure of Example 2 was adopted to produce compositions of the present invention having various compositions. The components used in these examples are listed in Table 2.

TABLE 2

| Raw materials | Examples (kg) 7 | 8 | 9 |
|---|---|---|---|
| *Artemisia annua* L. | | 20 | 15 |
| *Artemisia palustris* Linn. | 30 | | 15 |
| root skin of *Ulmus glabra* Huds. | 10 | 10 | 5 |
| *Artemisia argyi* Levl. et vant | 10 | 5 | 5 |
| *Brassica oleracea* L. var. Capitata L. | | 10 | |
| *Acacia pennata* Willd | 15 | | 10 |
| *Glycine soja* sieb. et Zucc | 15 | | 5 |
| *Phytolacca acinosa* Roxb | 20 | | |
| *Gleditsia sinensis* Lam. | | 15 | 15 |
| Tween-80 | | 10 | |
| Sodium dodecyl benzene sulfonate | 20 | 10 | 20 |
| Water | 400 | 400 | 400 |
| Plant ash | 40 | 40 | 40 |
| Sodium dodecanol polyethenoxy sulfate | | 140 | |
| Sodium dodecyl polyethenoxy sulfate | 180 | | |
| Nonyl phenyl polyethenoxy ether | 50 | | 250 |
| Sodium dodecyl amino propionate | | 100 | |
| Benzotriazole | 10 | 25 | 5 |
| Sodium nitrile | 50 | 40 | 45 |
| Diethanol | | 40 | 40 |
| Calcium chloride | 50 | | |
| Triethanolamine | | 1.2 | |
| Hexamethylene tetramine | | | 5 |
| Carboxymethyl cellulose | 5 | | 1 |
| Sodium carboxymethyl cellulose | | 3 | |

TABLE 2-continued

The obtained composites were diluted with tap water at a volume ratio of 1:3 to measure their performances of fire retarding, fire retarding and extinguishing, and anti-re-ignition. The results were listed in Table 4.

EXAMPLES 10-12

The same procedure of Example 3 was adopted to produce compositions of the present invention having various compositions. The components used in these examples are listed in Table 3.

TABLE 3

| Raw materials | Examples (kg) 10 | 11 | 12 |
|---|---|---|---|
| *Artemisia annua* L. | 15 | 20 | |
| *Artemisia palustris* Linn. | 15 | | 20 |
| root skin of *Ulmus glabra* Huds. | 20 | 10 | 5 |
| *Artemisia argyi* Levl. et vant | | 15 | 10 |
| *Brassica oleracea* L. var. Capitata L. | | 5 | |
| *Acacia pennata* Willd | 20 | | 15 |
| *Glycine soja* sieb. et Zucc | | 10 | |
| *Phytolacca acinosa* Roxb | 20 | | |
| *Gleditsia sinensis* Lam. | | 10 | 15 |
| Tween-80 | | 25 | 25 |
| Sodium dodecyl benzene sulfonate | 30 | | |
| Water | 400 | 400 | 400 |
| Plant ash | 40 | 40 | 40 |
| Sodium dodecanol polyethenoxy sulfate | | 220 | 150 |
| Sodium dodecyl polyethenoxy sulfate | 80 | | |
| Nonyl phenyl polyethenoxy ether | | | 70 |
| Sodium dodecyl amino propionate | 185 | | |
| Benzotriazole | 30 | | 30 |
| Sodium nitrile | 20 | 60 | 10 |
| Diethanol | 40 | | 40 |
| Calcium chloride | | 50 | |
| Triethanolamine | 4.5 | 5.5 | 5 |
| Hexamethylene tetraamine | 1 | | 2 |
| Carboxymethyl cellulose | | 6 | 4 |
| Sodium carboxymethyl cellulose | 5 | | |

The obtained compositions were diluted with tap water at a volume ratio of 1:3 to measure their performances of fire retarding, fire retarding and extinguishing, and anti-re-ignition. The results were listed in Table 4.

TABLE 4

| Composition | Fire retarding performance (s) | Fire retarding & extinguishing performance(s) | Anti-re-ignition performance |
|---|---|---|---|
| Example 4 | 4 | 6 | non-flashable, non-flammable |
| Example 5 | 4 | 6 | non-flashable, non-flammable |
| Example 6 | 3 | 5 | non-flashable, non-flammable |
| Example 7 | 5 | 9 | non-flashable, non-flammable |
| Example 8 | 4 | 8 | non-flashable, non-flammable |
| Example 9 | 3 | 6 | non-flashable, non-flammable |
| Example 10 | 3 | 7 | non-flashable, non-flammable |
| Example 11 | 4 | 8 | non-flashable, non-flammable |
| Example 12 | 5 | 8 | non-flashable, non-flammable |

EXAMPLE 13

Plant ash was mixed with tap water at a weight ratio of 1:20 homogeneous, and the mixture was kept for about 2 hours for extraction to obtain aqueous extract of plant ash.

The obtained aqueous was mixed with the composition of Example 1 at a volume ratio of 10:1 to obtain product.

The performances of the obtained product were as follows:

Fire retarding performance: 2 s

Fire retarding and extinguishing performance: 5 s

Anti-re-ignition performance: non-flashable, non-flammable.

EXAMPLE 14

Plant ash was mixed with tap water at a weight ratio of 4:20 homogeneously and the mixture was kept for about 2 hours for extraction to obtain aqueous extract of plant ash.

The obtained aqueous solution was mixed with the composition of Example 2 at a volume ratio of 12:1 to obtain product.

The performances of the obtained product were as follows:

Fire retarding performance: 2 s

Fire retarding and extinguishing performance: 6 s

Anti-re-ignition performance: non-flashable, non-flammable.

Referring to the following test examples, the advantages, effects etc., are further explained.

TEST EXAMPLE 1

EXTINGUISH OF FIRE OF OIL POOL 2.5 tons of oil having initial boiling point higher than 88° C., end boiling point lower than 350° C. was added into an outdoor pool having surface area of 50 $m^2$ depth of 0.5 m. The fire retarding and extinguishing composition prepared in Example 1 was diluted with tap water at a volume ratio of 1:3, the thus obtained dilutant was charged into ordinary fire vehicles.

The oil in said pool was ignited and pre-burned for 5 minutes under the wind power being at 7th grade, wind speed being 13.8–16.8 m/s until the temperature of flame being in the range of 1800°–2000° C. Then the composite solution of the present invention was mist sprayed toward the root of the flame at a flow rate of 7.2 l/s via the above-mentioned fire vehicle. Time duration from the beginning of the mist spray until fire had been extinguished completely was recorded. The test was repeated twice to obtain the average result of the two tests.

The test results were as follows: time duration for extinguish was 11 seconds; the total usage of the composite of the present invention was 79.2 liters. A solid film was formed on the surface of the oil after extinguish, the residual oil splashed out from the oil pool was non-flashable, non-flammable.

COMPARATIVE TEST EXAMPLE 1

The same procedure of TEST EXAMPLE 1 was repeated except that the fire retarding and extinguishing composition of the present invention was substituted by sodium salt powder extinguishing agent.

The test results were as follows: time duration for complete fire extinguish was 97 seconds; the total usage of sodium salt powder extinguishing agent was 412 kg.

TEST EXAMPLE 2

EXTINGUISH OF FIRE OF FUEL TANK

Figure 5:
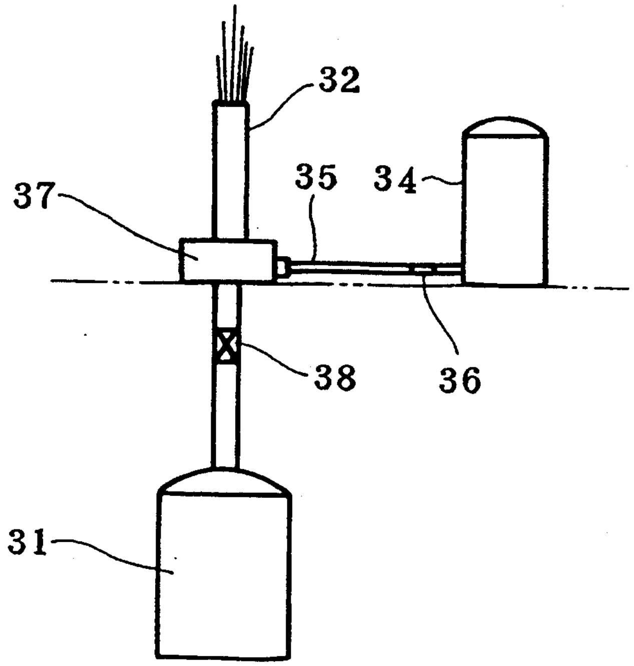
FIG. 5 is a schematic drawing of an analogue device for extinguishing the fire caused by oil well blowout.

Extinguish of fire in fuel tank test was carried out by using the analogue device shown in FIG. 5. As shown in FIG. 5, said analogue device included a 50 liter fuel tank (26), a 5 liter tank (21) for fire retarding and extinguishing composition solution. Said tank (26) had a jacket (5) connected with tank (21) via a pipe (22). A valve (23) for releasing pressure and preventing explosive combustion and a fuel inlet (24) were installed at the top of tank (26).

30 liters of oil having initial boiling point higher than 88° C. and end boiling point lower than 105° C. was added into fuel tank (26). 1.5 liter of fire retarding and extinguishing composition prepared in Example 2 was diluted by 1.5 liter of tap water and was added into tank (21). Tank (21) was pressured with compressed air to make the pressure therein become 0.7 MPa. The fuel in tank 26 was ignited by launching a fire bomb 100–150 mm above the surface of the oil therein along arrow W. The time duration from launching fire bomb until the fire in tank (26) being extinguished completely was recorded. The test was repeated twice to obtain the average results of the two tests.

The test results were as follows: the time duration of fire extinguish was 2 seconds; no flame was extruded from tank (26); the shape of tank (26) was not changed; a lot of smoke was discharged; the oil residue splashed out from tank (26) was non-flashable and non-flammable.

TEST EXAMPLES 3–11

Various fire retarding and extinguishing compositions prepared in other examples of the present invention was diluted with tap water at various ratio, and the obtained dilutants, as well as protein fire foam were used as fire extinguishing agents to carried out the same test of test example 2. The test results were listed in Table 5.

TABLE 5

| Test | Fire extinguishing agent | | Time duration for fire | Anti-re-ignition |
|---|---|---|---|---|
| Ex. | Ex. | water:agent | extinguish(s) | performance |
| 3 | 3 | 35:75 | 3 | non-flashable, non-flammable. |
| 4 | 4 | 1:1 | 1.5 | non-flashable, non-flammable. |
| 5 | 5 | 1:1 | 2 | non-flashable, non-flammable. |
| 6 | 6 | 1:1 | 2 | non-flashable, non-flammable. |
| 7 | 7 | 1:1 | 1.5 | non-flashable, non-flammable. |
| 8 | 8 | 1:1 | 1.5 | non-flashable, non-flammable. |
| 9 | 9 | 1:1 | 2 | non-flashable, non-flammable. |
| 10 | 10 | 1:1 | 1.5 | non-flashable, non-flammable. |
| 11 | protein fire foam | | The extinguishing effect on the fire inside fuel tank was not good; the residual oil outside fuel tank continued to burn | |

TEST EXAMPLE 12

EXTINGUISH OF FIRE OF OIL WELL BLOWOUT

Test of extinguish of fire of oil well blowout was carried out by using the analogue device shown in FIG. 5. Said analogue device included a 5 $m^3$ oil tank (31), a 3 $m^3$ tank (34) for fire retarding and extinguishing composite of the present invention. An oil spray pipe (32) having a diameter of 50.8 mm was installed at the top of tank (34), a valve (38) was disposed at the lower portion of said pipe (34) and a fire extinguishing room (35) was disposed at the upper portion of said pipe (35). A fire retarding and extinguishing composition delivery pipe (31) was disposed at the bottom of tank (34) and connected with room (35). A valve (36) was disposed on said pipe (31).

3 tons of an oil mixture containing 50 percent by weight of Shengli crude oil, 30 percent by weight of 80# gasoline and 20 percent by weight of 0# diesel oil was added into tank (31) and buried 9 meters underground. Then tank (31) was compressed to adjust the pressure therein being of 0.8 MPa by an air compressor.

The composition prepared in Example 1 was diluted with tap water at a volume ratio of 1:1. 2.5 tons of the obtained dilutant was added into tank (34), and then was compressed by an air compressor to adjust the pressure therein being of 1 MPa.

Valve (38) was turned on to carry out the test. The outlet velocity of pipe (32) was 39.24 m/s. The flow rate of oil was 0.075 $m^3/s$ (4.2 t/min.). The extruded oil was ignited immediately. When the height of flame was at its highest (28.9 m) after about 5 seconds, valve (36) was then turned on. The time duration from turning on valve (36) to fire being completely extinguished was recorded. The test was repeated twice to obtain an average result of the two tests.

The test results were as follows: the time duration for fire extinguish was 8 seconds; no spark being existed during the dropping of the oil and after the oil dropped onto the ground; the oil residue after fire extinguish being non-flashable and non-flammable.

The test was also carried out by using protein fire foam as fire extinguishing agent, and found that the fire can not be extinguished.

TEST EXAMPLE 13

EXTINGUISH OF CLASS A FIRE

Test on extinguish of class A fire was carried out according to ISO 7202-1987(E). Fire extinguishing agent was any of the dilutant obtained by diluting any one of the composites prepared in Examples 1–12 with tap water at a volume ratio of 1:10. The flammable material used was spruce wood. The test results were met the necessities of ISO 7202-1987(E). The usage of said dilutant was 3 liters. After extinguish, the spruce wood can not be reignited.

TEST EXAMPLE 14

INHIBITION AND PREVENTION ON HEAVY OIL FIRE

Figure 6:
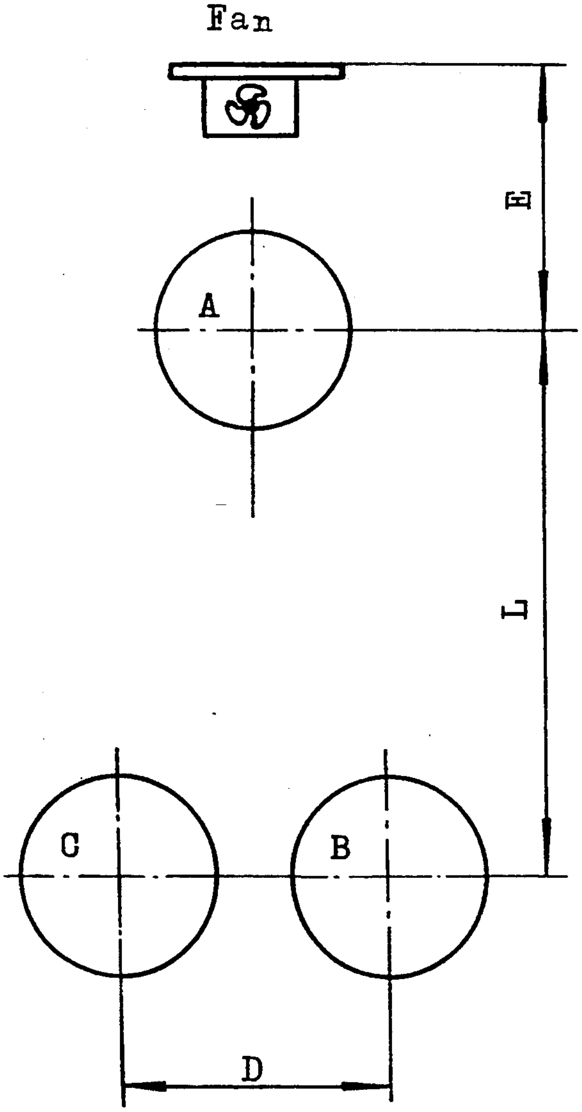
FIG. 6 is a schematic drawing of a test device for preventing and suppressing fires of heavy oils.

Three oil pans A, B and C having surface area of 1 $m^2$, depth of 200 mm were arranged according to FIG. 6, wherein, D=2600 mm, L=5000 mm, and E=4500 mm. A fan was disposed behind pan A. Shengli crude oil was added into the three pans until the vertical distances between the oil surface and the upper edges of the three pans being about 50 mm.

3 kg of fluoro-protein fire foam and fire retarding and 3 kg of extinguishing composition of example 13 of the present invention were added into two portable extinguishers, respectively, and the pressure therein were adjusted to about 1 MPa, respectively.

The oil in pan A was ignited. Five minutes later, fan D was turned on and the wind speed was adjusted in the range of about 10.8 to about 13.8 m/s to make pans B and C being heat radiated by the flame of pan A. At the same time, 1.5 liters of fluoro-protein fire foam was sprayed into pan C, while 1.5 liters of fire retarding and extinguishing composition prepared in example 13 of the present invention was sprayed into pan B. When the temperature around pans B and C come up to 70° C., timing began. 105 seconds later, the oil in pan C was ignited. However, 1 hour later, the oil in pan B was not ignited.

TEST EXAMPLE 15

CHANGE ON FLASH POINT OF FLAMMABLE LIQUID

Fire retarding and extinguishing composition of example 1 or 2 of the present invention, aqueous extract of plant ash prepared in example 13 of the present invention and 92# gasoline or anhydrous ethanol were mixed at a volume ratio of 10:55:35. The changes of flash point of flammable liquid were measured. The results were listed in Table 6.

Triethyl phosphate was mixed with 92# gasoline or anhydrous ethanol at a volume ratio of 65:35. The changes of flash point of flammable liquid were measured. The results were listed in Table 6.

TABLE 6

| Fire extinguishing agent | Liquid fuel | Changes of flash point (°C.) |
|---|---|---|
| Example 1 | 92# gasoline | 110–120 |
| | anhydrous ethanol | 92–110 |
| Example 2 | 92# gasoline | 110–120 |
| | anhydrous ethanol | 95–110 |
| Triethyl phosphate | 92# gasoline | 25–30 |
| | anhydrous ethanol | 15–20 |

What is claimed is:

1. Fire retarding and extinguishing composition which is an aqueous solution, comprising:

(a) an aqueous extract of plant ash and at least one plant selected from the group consisting of Sapindaceae, Compositae, Cruciferae, Leguminosae, root skin of Ulmaceae, Phytolaccaceae and Cotton seed, said aqueous extract of plant ash and plant(s) contains such a large amount of salts, esters, saccharides, cellulose, and proteins that it can form films when applied to a liquid or solid substrate;

(b) at least one surfactant, in an amount of 30–60 percent by weight of the weight of said aqueous extract of plant ash and said plants.

2. A liquid fire retarding and extinguishing composition according to claim 1, wherein the Sapindaceae include *Sapindus mukorossi* Gaertn or *Sapindus discolor* muell. Arg.;

said Compositae include Centaurea Cyanus Linn or *Centaurea moschata* of Centaurea L.; *Artemisia annua* L., *Artemisia palustris* Linn., *Artemisia halodendron* Turcz. *Artemisia apiacea* Hance, *Artemisia*

*argyi* Levl. et Vant or *Artemisia vulgaris* L. of Artemisia L.;

said Cruciferae include *Brassica chinensis* L., *Brassica oleracea* L. var. Capitata L., *Brassica juncea* Czern. et Coss, *Brassica pekinensis* Rupr. or *Brassica campestris* L. var oleifera DC of Brassica;

said Leguminosae include Glycine max Merrill or *Glycine soja* sieb. et Zucc of Glycine Willd; Phaseolus Multiflorus Willd of Phaseolus L.; *Gymnocladus chinensis* Bail. of Gymnocladus Lam.; *Gleditsia sinensis* Lam., *Gleditsia melanacantha* or *Gleditsia microphylla* of Gleditschia; or *Acacia pennata* Willd of Acacia Mill;

said Ulmaceae include *Ulmus pumila* L., ulmus glabra Huds., *Ulmus keaki* or *Zelkova schneideriana* H.-M. of Ulmus L.; and said Phytolaccaceae include *Phytolacca acinosa* Roxb. of Phytolacca L.

3. A liquid fire retarding and extinguishing composition according to claim 1, wherein said surfactant is anionic surfactant, non-ionic surfactant, amphiprotic ionic surfactant, or a mixture thereof.

4. A liquid fire retarding and extinguishing composition according to claim 3, wherein said surfactant is dodecyl polyethenoxy sodium sulfate.

5. A liquid fire retarding and extinguishing composition according to claim 3, wherein said surfactant is dodecanol polyethenoxy ether.

6. A liquid fire retarding and extinguishing composition according to claim 3, wherein said surfactant is a mixture of sodium dodecyl aminopropionate and nonyl phenol polyethenoxy ether with a weight ratio of (40–60):(60–40).

7. A liquid fire retarding and extinguishing composition according to claim 1, wherein said aqueous extract is prepared by: solarizing the selected plants in the sun, crushing the solarized plants into pieces of 5–20 mm by a crusher, mixing the pieces with plant ash and water according to a ratio of (5–10):(3–5):(30–50), extracting at room temperature for about 2 hours, extracting at 40°–60° C. for 2 hours, heating the mixture to a temperature of about 90°–100° C. and retain the temperature for another 2 hours, cooling the mixture to a temperature of about 40° C. or lower, and then filtering twice with filtering cloth to remove the solid materials.

8. A liquid fire retarding and extinguishing composition according to claim 7, wherein said aqueous extract is an aqueous extract of 4 parts of plant ash, 1 part of *Artemisia annua* L., 1 part of artemisia palustris Linn., 0.5 part of root skin of ulmus pumila L., 1 part of artemisia argyi Levl. et Vant, 2 parts of gleditsia sinensis Lam., and 2 parts of brassica campestris L. var. oleifera DC, with 40 parts of water (all based on weight).

9. A liquid fire retarding and extinguishing composition according to claim 7, wherein said aqueous extract is an aqueous extract of 4 parts of plant ash, 1 part of artemisia annua L., 1 part of root skin of ulmus pumila L., 1 part of artemisia argyi Levl. et Vant, 2 parts of brassica oleracea L. var. Capitata L., 2 parts of sapindus mukoressi Guertn, 2 parts of cottonseed, and 1 part of centaurea cyanus L., with 40 parts of water (all based on weight).

10. A liquid fire retarding and extinguishing composition according to claim 7, wherein said aqueous extract is an aqueous extract of 4 parts of plant ash, 2 parts of artemisia palustris Linn., 1 part of brassica oleracea L. var. Capitata L., 1 part of *Acacia pennata* Willd, 1 part of gleditsia sinensis Lam., 1 part of sapindus, and 1 part of artemisia halodendron Turcz., with 40 parts of water (all based on weight).

11. A liquid fire retarding and extinguishing composition according to claim 7, wherein said aqueous extract further contains a surfactant in an amount of 5–10 percent by weight of the weight of water.

12. A liquid fire retarding and extinguishing composition according to claim 11, wherein said surfactant is sodium dodecylbenzene sulfonate or Tween-80.

13. A liquid fire retarding and extinguishing composition according to claim 1, further containing at least one stabilizer.

14. A liquid fire retarding and extinguishing composition according to claim 13, wherein said stabilizer comprises triethanolamine, carboxymethylcellulose or carboxymethylcellulose sodium salt.

15. A liquid fire retarding and extinguishing composition according to claim 1, comprising at least one preservative.

16. A liquid fire retarding and extinguishing composition according to claim 15, wherein said preservative comprises sodium nitrite, benzotriazole or hexamethylene tetramine.

17. A liquid fire retarding and extinguishing composition according to claim 1, comprising at least one antifreezing agent.

18. A liquid fire retarding and extinguishing composition according to claim 17, wherein said anti-freezing agent comprises calcium chloride, glycol or lithium chloride.

19. A liquid fire retarding and extinguishing composition according to claim 1, comprising 0.7–1.4 parts of triethanolamine, 1–8 parts of sodium nitrite, 0.2–0.4 parts of hexamethylene tetramine, and 10–30 parts of calcium chloride or glycol based on each 100 parts of said aqueous extract (all based on weight).

20. A liquid fire retarding and extinguishing composition comprising:

(a) an aqueous extract of plant ash and at least one plant selected from a group consisting of plants of *Artemisia annua* L., *Artemisia palustris* Linn., *Artemisia halodendron* Turcz., root skin of *Ulmus glabra* Huds., root of *Ulmus pumila* L., *Brassica campestris* L. var. oleifera DC, *Brassica oleracea* L. var. Capitata L., Phaseolus Multiflorus Willd, *Gleditsia sinensis* Lam., *Artemisia argyi* Levl. et Vant, *Phytolacca acinosa* Roxb., Acacia pennata Willd, and Centaurea Cyanus Linn, said aqueous extract of plant ash and plant(s) contains such a large amount of salts, esters, saccharides, cellulose, and proteins that it can form films when applied to a liquid or solid substrate;

(b) at least one surfactant, in an amount of 30–60 percent by weight of the weight of said aqueous extract of plant ash and plants;

(c) an aqueous extract of plant ash, in an amount 1–20 times of the total weight of (a)+(b).

21. A liquid fire retarding and extinguishing composite according to claim 20, wherein said aqueous extract of plant ash is prepared from a mixture of plant ash and water according to a weight ratio of (1–5):20.

22. A liquid fire retarding and extinguishing composition according to claim 20, comprising 0.7–1.4 parts of triethanolamine, 1–8 parts of sodium nitrite, 0.2–0.4 parts of hexamethylene tetramine, and 10–30 parts of calcium chloride or glycol, based on each 100 parts of the total weight of said components (a)+(c).

* * * * *